(12) United States Patent
Lyman (10) Patent No.: US 11,113,663 B2
(45) Date of Patent: *Sep. 7, 2021

(54) SYSTEM AND METHOD FOR AUTOMATIC INSERTION OF CALL INTELLIGENCE IN AN INFORMATION SYSTEM

(71) Applicant: Fonality, Inc., Plano, TX (US)

(72) Inventor: Christopher M. Lyman, Culver City, CA (US)

(73) Assignee: Fonality, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,911

(22) Filed: Jun. 5, 2019

(65) Prior Publication Data
US 2019/0287067 A1    Sep. 19, 2019

Related U.S. Application Data

(63) Continuation of application No. 12/405,197, filed on Mar. 16, 2009, now Pat. No. 10,318,922.

(51) Int. Cl.
*G06Q 10/00* (2012.01)
*G06Q 10/10* (2012.01)
*G06Q 10/06* (2012.01)
*G06F 16/907* (2019.01)

(52) U.S. Cl.
CPC .......... *G06Q 10/10* (2013.01); *G06F 16/907* (2019.01); *G06Q 10/06311* (2013.01)

(58) Field of Classification Search
CPC ............. G06Q 10/10; G06Q 10/06311; G06Q 10/063; G06F 17/30997; G06F 16/907; H04M 3/436; H04M 3/42221; H04M 3/2218; H04M 3/22
See application file for complete search history.

(56) References Cited

U.S. PATENT DOCUMENTS

| | | | |
|---|---|---|---|
| 4,653,090 | A | 3/1987 | Hayden |
| 5,533,110 | A | 7/1996 | Pinard et al. |
| 5,703,943 | A | 12/1997 | Otto |
| 5,754,636 | A | 5/1998 | Bayless et al. |
| 5,854,834 | A | 12/1998 | Gottlieb et al. |
| 5,940,488 | A | 8/1999 | DeGrazia et al. |

(Continued)

FOREIGN PATENT DOCUMENTS

| WO | WO04049121 | 6/2004 |
|---|---|---|
| WO | WO05036330 | 4/2005 |
| WO | WO06020168 | 2/2006 |

OTHER PUBLICATIONS

Kim, Fryer, ed. Microsoft Press Computer Dictionary. 3rd ed. Redmond: Microsoft, 1997. 456-457.

(Continued)

*Primary Examiner* — William S Brockington, III
(74) *Attorney, Agent, or Firm* — Dentons US LLP (57) ABSTRACT

Systems and methods for providing automatic insertion of call intelligence in an information system are provided. In exemplary embodiments, new call detail records are accessed. At least one individual associated with the new call detail record may then be identified, and a subject matter associated with the new call detail record determined. A call intelligence record based on the identified individual and the subject matter is then generated and automatically inserted into the information system.

7 Claims, 6 Drawing Sheets

(56) References Cited

U.S. PATENT DOCUMENTS

| | | | |
|---|---|---|---|
| 6,067,525 A | 5/2000 | Johnson et al. | |
| 6,104,711 A | 8/2000 | Voit | |
| 6,137,869 A | 10/2000 | Voit et al. | |
| 6,282,574 B1 | 8/2001 | Voit | |
| 6,359,880 B1 | 3/2002 | Curry et al. | |
| 6,389,132 B1 | 5/2002 | Price | |
| 6,400,719 B1 | 6/2002 | Chimura et al. | |
| 6,418,214 B1 | 7/2002 | Smythe et al. | |
| 6,430,275 B1 | 8/2002 | Voit et al. | |
| 6,430,289 B1 | 8/2002 | Liffick | |
| 6,453,038 B1 | 9/2002 | McFarlane et al. | |
| 6,628,765 B1 | 9/2003 | Bangs et al. | |
| 6,718,030 B1 | 4/2004 | Turner et al. | |
| 6,782,412 B2 | 8/2004 | Brophy et al. | |
| 6,820,083 B1 | 11/2004 | Nagy et al. | |
| 6,937,703 B1 | 8/2005 | Andreason | |
| 6,964,370 B1 | 11/2005 | Hagale et al. | |
| 7,007,074 B2 | 2/2006 | Radwin | |
| 7,031,442 B1 | 4/2006 | Neyman et al. | |
| 7,035,619 B1 | 4/2006 | Fargano et al. | |
| 7,035,923 B1 | 4/2006 | Yoakum et al. | |
| 7,039,165 B1 | 5/2006 | Saylor et al. | |
| 7,065,184 B2 | 6/2006 | Vishik et al. | |
| 7,076,036 B1 | 7/2006 | Johnson | |
| 7,089,237 B2 | 8/2006 | Turnbull et al. | |
| 7,092,509 B1 | 8/2006 | Mears et al. | |
| 7,120,238 B1 | 10/2006 | Bednarz et al. | |
| 7,136,875 B2 | 11/2006 | Anderson et al. | |
| 7,194,531 B2 | 3/2007 | Donker et al. | |
| 7,213,073 B1 | 5/2007 | Slavin | |
| 7,231,229 B1 | 6/2007 | Hawkins et al. | |
| 7,274,781 B2 | 9/2007 | Lipton et al. | |
| 7,333,976 B1 | 2/2008 | Auerbach et al. | |
| 7,441,002 B1 | 10/2008 | Catchpole et al. | |
| 7,477,730 B2 | 1/2009 | Starbuck et al. | |
| 7,496,185 B1 | 2/2009 | Primavesi et al. | |
| 7,496,189 B2 | 2/2009 | Clarisse et al. | |
| 7,536,000 B2 | 5/2009 | Ho | |
| 7,567,662 B1 | 7/2009 | Renner et al. | |
| 7,586,908 B2 | 9/2009 | Nelson et al. | |
| 7,606,221 B2 | 10/2009 | Artru et al. | |
| 7,664,096 B2 | 2/2010 | Doherty et al. | |
| 7,664,495 B1 | 2/2010 | Bonner et al. | |
| 7,685,010 B2 | 3/2010 | Goldberg et al. | |
| 7,706,522 B2 | 4/2010 | Shaffer et al. | |
| 7,711,104 B1 | 5/2010 | Flockhart et al. | |
| 7,716,263 B2 | 5/2010 | Masek | |
| 7,835,510 B2 | 11/2010 | Akachi | |
| 7,844,677 B1 | 11/2010 | Asher et al. | |
| 7,881,454 B2 | 2/2011 | Tuchman et al. | |
| 7,920,549 B2 | 4/2011 | Alt et al. | |
| 7,983,404 B1 | 7/2011 | Croak et al. | |
| 8,098,810 B2 | 1/2012 | Lyman | |
| 8,131,872 B2 | 3/2012 | Kennedy et al. | |
| 8,132,001 B1 | 3/2012 | Patten et al. | |
| 8,214,265 B2 | 7/2012 | Peters | |
| 8,223,941 B2 | 7/2012 | White et al. | |
| 8,341,535 B2 | 12/2012 | Lyman | |
| 8,379,832 B1 | 2/2013 | Lyman | |
| 8,495,653 B2 | 7/2013 | Lyman | |
| 8,499,246 B2 | 7/2013 | Lyman | |
| 8,571,202 B2 | 10/2013 | Lyman | |
| 8,693,659 B2 | 4/2014 | Lyman | |
| 8,719,386 B2 | 5/2014 | Lyman et al. | |
| 8,780,925 B2 | 7/2014 | Otto et al. | |
| 8,787,548 B2 | 7/2014 | Lyman | |
| 8,832,717 B2 | 9/2014 | Lyman | |
| 8,976,952 B2 | 3/2015 | Lyman | |
| 9,001,993 B2 | 4/2015 | Lyman | |
| 9,395,873 B2 | 7/2016 | Lyman | |
| 9,443,244 B2 | 9/2016 | Lyman | |
| 2002/0009073 A1 | 1/2002 | Furukawa et al. | |
| 2002/0029258 A1 | 3/2002 | Mousseau et al. | |
| 2002/0035605 A1 | 3/2002 | McDowell et al. | |
| 2002/0064149 A1 | 5/2002 | Elliott et al. | |
| 2002/0110234 A1 | 8/2002 | Walker et al. | |
| 2002/0116336 A1 | 8/2002 | Diacakis et al. | |
| 2002/0120687 A1 | 8/2002 | Diacakis et al. | |
| 2003/0002521 A1 | 1/2003 | Traversat et al. | |
| 2003/0009530 A1 | 1/2003 | Philonenko et al. | |
| 2003/0026414 A1 | 2/2003 | Baker et al. | |
| 2003/0078986 A1 | 4/2003 | Ayres et al. | |
| 2003/0112941 A1 | 6/2003 | Brown et al. | |
| 2003/0219029 A1 | 11/2003 | Pickett | |
| 2003/0228010 A1 | 12/2003 | Clarisse et al. | |
| 2004/0001573 A1 | 1/2004 | Gusler et al. | |
| 2004/0039889 A1 | 2/2004 | Elder et al. | |
| 2004/0042444 A1 | 3/2004 | Edmon et al. | |
| 2004/0062383 A1 | 4/2004 | Sylvain | |
| 2004/0083306 A1 | 4/2004 | Gloe | |
| 2004/0088356 A1 | 5/2004 | Sellen et al. | |
| 2004/0093387 A1 | 5/2004 | Wick | |
| 2004/0107267 A1 | 6/2004 | Donker et al. | |
| 2004/0114571 A1 * | 6/2004 | Timmins | H04L 12/66 370/352 |
| 2004/0133888 A1 | 7/2004 | Ard et al. | |
| 2004/0139106 A1 * | 7/2004 | Bachman | G06F 16/951 |
| 2004/0141508 A1 | 7/2004 | Schoeneberger et al. | |
| 2004/0170267 A1 | 9/2004 | Seligmann | |
| 2004/0179515 A1 | 9/2004 | Kamani et al. | |
| 2004/0179672 A1 | 9/2004 | Pagel et al. | |
| 2004/0203944 A1 | 10/2004 | Huomo et al. | |
| 2004/0218747 A1 | 11/2004 | Ranalli et al. | |
| 2004/0246331 A1 | 12/2004 | Caspi et al. | |
| 2004/0260771 A1 | 12/2004 | Gusler et al. | |
| 2004/0264670 A1 | 12/2004 | Flores et al. | |
| 2004/0267887 A1 | 12/2004 | Berger et al. | |
| 2005/0068166 A1 | 3/2005 | Baker | |
| 2005/0068227 A1 | 3/2005 | Caspi et al. | |
| 2005/0074101 A1 | 4/2005 | Moore et al. | |
| 2005/0076095 A1 | 4/2005 | Mathew et al. | |
| 2005/0105709 A1 | 5/2005 | Dutronc et al. | |
| 2005/0111440 A1 | 5/2005 | Artru et al. | |
| 2005/0135593 A1 | 6/2005 | Becerra et al. | |
| 2005/0152347 A1 | 7/2005 | Chen et al. | |
| 2005/0201362 A1 | 9/2005 | Klein et al. | |
| 2005/0209861 A1 | 9/2005 | Hewes et al. | |
| 2005/0220283 A1 | 10/2005 | Ho | |
| 2005/0239501 A1 | 10/2005 | Idnani et al. | |
| 2005/0243978 A1 | 11/2005 | Son et al. | |
| 2005/0246588 A1 | 11/2005 | Deng et al. | |
| 2006/0019655 A1 | 1/2006 | Peacock | |
| 2006/0026232 A1 | 2/2006 | Malik | |
| 2006/0039545 A1 | 2/2006 | Rahman et al. | |
| 2006/0093099 A1 | 5/2006 | Cho | |
| 2006/0093121 A1 | 5/2006 | Sylvain | |
| 2006/0100923 A1 | 5/2006 | Courchesne | |
| 2006/0109811 A1 | 5/2006 | Schotten et al. | |
| 2006/0117264 A1 | 6/2006 | Beaton et al. | |
| 2006/0121916 A1 | 6/2006 | Aborn et al. | |
| 2006/0140452 A1 | 6/2006 | Raynor et al. | |
| 2006/0146870 A1 | 7/2006 | Harvey et al. | |
| 2006/0147009 A1 | 7/2006 | Greenlee et al. | |
| 2006/0166678 A1 | 7/2006 | Karaoguz et al. | |
| 2006/0167747 A1 | 7/2006 | Goodman et al. | |
| 2006/0177032 A1 | 8/2006 | Abramson et al. | |
| 2006/0185004 A1 | 8/2006 | Song et al. | |
| 2006/0195532 A1 | 8/2006 | Zlateff et al. | |
| 2006/0210046 A1 | 9/2006 | Smith | |
| 2006/0212519 A1 | 9/2006 | Kelley et al. | |
| 2006/0256789 A1 | 11/2006 | Otto et al. | |
| 2006/0256942 A1 | 11/2006 | Gatzke et al. | |
| 2006/0288099 A1 | 12/2006 | Jefferson et al. | |
| 2007/0011337 A1 | 1/2007 | Brown et al. | |
| 2007/0041527 A1 | 2/2007 | Tuchman et al. | |
| 2007/0061197 A1 | 3/2007 | Ramer et al. | |
| 2007/0064913 A1 | 3/2007 | Shaffer et al. | |
| 2007/0078708 A1 | 4/2007 | Yu et al. | |
| 2007/0121896 A1 | 5/2007 | Patakula et al. | |
| 2007/0153747 A1 | 7/2007 | Pan et al. | |
| 2007/0165640 A1 | 7/2007 | Fitchett et al. | |
| 2007/0204218 A1 | 8/2007 | Weber et al. | |
| 2007/0217434 A1 | 9/2007 | Welbourn | |
| 2007/0244973 A1 | 10/2007 | Pearson | |

(56) References Cited

U.S. PATENT DOCUMENTS

| | | |
|---|---|---|
| 2007/0264977 A1 | 11/2007 | Zinn et al. |
| 2007/0268506 A1 | 11/2007 | Zeldin |
| 2008/0025316 A1 | 1/2008 | Zampiello et al. |
| 2008/0031228 A1 | 2/2008 | Gallant |
| 2008/0095355 A1 | 4/2008 | Mahalaha et al. |
| 2008/0101567 A1 | 5/2008 | Baudino et al. |
| 2008/0103907 A1 | 5/2008 | Maislos et al. |
| 2008/0126216 A1 | 5/2008 | Flensted-Jensen et al. |
| 2008/0130856 A1 | 6/2008 | Ku et al. |
| 2008/0147831 A1 | 6/2008 | Redjaian et al. |
| 2008/0162701 A1 | 7/2008 | Ryabchun et al. |
| 2008/0215428 A1 | 9/2008 | Ramer et al. |
| 2008/0219423 A1 | 9/2008 | Lyman |
| 2008/0222174 A1 | 9/2008 | Lyman |
| 2008/0222549 A1 | 9/2008 | Lyman |
| 2008/0222656 A1 | 9/2008 | Lyman |
| 2008/0275785 A1 | 11/2008 | Altberg et al. |
| 2008/0313543 A1 | 12/2008 | Altberg et al. |
| 2009/0012373 A1 | 1/2009 | Raij et al. |
| 2009/0019094 A1 | 1/2009 | Lashley et al. |
| 2009/0022149 A1 | 1/2009 | Rosenberg et al. |
| 2009/0043657 A1 | 2/2009 | Swift et al. |
| 2009/0074159 A1 | 3/2009 | Goldfarb et al. |
| 2009/0076917 A1 | 3/2009 | Jablokov et al. |
| 2009/0080411 A1 | 3/2009 | Lyman |
| 2009/0100047 A1 | 4/2009 | Jones et al. |
| 2009/0106427 A1 | 4/2009 | Plumb |
| 2009/0116443 A1 | 5/2009 | Walker et al. |
| 2009/0141884 A1 | 6/2009 | Lyman |
| 2009/0170519 A1 | 7/2009 | Wilhoite et al. |
| 2009/0275314 A1 | 11/2009 | Cotevino et al. |
| 2010/0174807 A1 | 7/2010 | Lyman et al. |
| 2010/0211660 A1 | 8/2010 | Kiss et al. |
| 2010/0232585 A1 | 9/2010 | Lyman |
| 2010/0235223 A1 | 9/2010 | Lyman |
| 2010/0287481 A1 | 11/2010 | Sawada et al. |
| 2011/0286444 A1 | 11/2011 | Petrovykh |
| 2011/0306298 A1 | 12/2011 | Lyman |
| 2012/0266080 A1 | 10/2012 | Zellner et al. |
| 2013/0022038 A1 | 1/2013 | Cadiz et al. |
| 2013/0108035 A1 | 5/2013 | Lyman |
| 2013/0148800 A1 | 6/2013 | Lyman |
| 2013/0243181 A1 | 9/2013 | Sirstins et al. |
| 2013/0268866 A1 | 10/2013 | Lyman |
| 2013/0268948 A1 | 10/2013 | Lyman |
| 2014/0029745 A1 | 1/2014 | Lyman |
| 2016/0277567 A1 | 9/2016 | Lyman |

OTHER PUBLICATIONS

Inter-Tel, Inc. "Advanced Applications Design Guide for Contact Center Suite." Issue 1. Apr. 2006.

Enhanced Enterprise Communication: Transforming the bank into a proactive relationship center.

Network Intelligence for Presence Enhanced Communication.

Presence Aggregation in Endpoints.

Hull, et al., Enabling Context-Aware and Privacy-Conscious User Data Sharing, 2004, Proceedings of the 2004 IEEE International Conference on Mobile Data Management.

Broder, et al., Search Advertising Using Web Relevance Feedback, 2008, pp. 1013-1022, Conference on Information and Knowledge Management, Proceeding of the 17th AC conference on Information and Knowledge Management.

What is Xact View? Xact View User Guide, Schmooze Communications LLC 2008. www.schmooze.com.

* cited by examiner

SYSTEM AND METHOD FOR AUTOMATIC INSERTION OF CALL INTELLIGENCE IN AN INFORMATION SYSTEM

CROSS REFERENCE TO RELATED APPLICATIONS

The present application is a Continuation of U.S. Non-provisional application Ser. No. 12/405,197 filed 16 Mar. 2009; which is incorporated herein by reference in its entirety.

TECHNICAL FIELD

Embodiments of the present invention relate generally to communication systems and more particularly to providing automatic insertion of call intelligence in a customer information system.

BACKGROUND

Conventionally, a customer relationship management (CRM) system is utilized to allow a company to measure, control, and maintain records of contacts with their customers. The contact may be by such means as phone calls, mail, and e-mails. The data that is maintained by the CRM system may then be used to measure effectiveness of employees, analyze customer relationships, or perform other analysis and reporting functions. As such, the CRM system may comprise a collection of data about interactions with the company's customers. As a result, an agent associated with the company is able to look up a customer's record on the CRM system.

In terms of phone calls made between agents and customers, traditional CRM systems rely on the agents to enter call details into records of the CRM system. For example, the agent may be asked to access a computer and manually type in information related to the phone call (e.g., date, duration, subject matter of the phone call). Unfortunately, there are many disadvantageous to relying on an agent to enter the call details. First, the agent may forget or decide not to manually enter the call details resulting in no record of the customer contact at all in the CRM system. Even if the agent does enter the call details, the call details may be subject to human error (e.g., typographically mistakes).

Therefore, there would be an advantage to having a system that allows for automatic insertion of call intelligence into a customer information system.

SUMMARY

Embodiments of the present invention provide systems and methods for automatic insertion of call intelligence in an information system. In exemplary embodiments, new call detail records are accessed. At least one individual associated with each new call detail record may then be identified. The individual may be one or more customers with an established relationship with an organization associated with the information system. The individual may also be one or more agents associated with the organization.

A subject matter associated with the new call detail record is then determined. In exemplary embodiments, heuristics may be utilized whereby queries to records stored in an information database may be used to determine a most likely subject matter associated with the new call detail record. A call intelligence record based on the at least one identified individual and the most likely subject matter is then generated. The call intelligence record is then automatically inserted into the records of the information system.

DETAILED DESCRIPTION OF PREFERRED EMBODIMENTS

Embodiments of the present invention provide systems and methods for automatic insertion of call intelligence in an information system, such as for example, a customer information system. In exemplary embodiments, a call intelligence record is automatically generated based at least on a call detail record from the phone system and data from the information system. The call intelligence record may comprise details regarding a phone call between an agent of a company or organization, which owns, or is otherwise associated with, the information system, and a customer or user talking to the agent. The call intelligence record may include, for example, call date, duration, name of parties, and subject matter of the phone call. The call intelligence record is then automatically inserted into the information system and associated with the identified customer or user in the information database.

Figure 1:
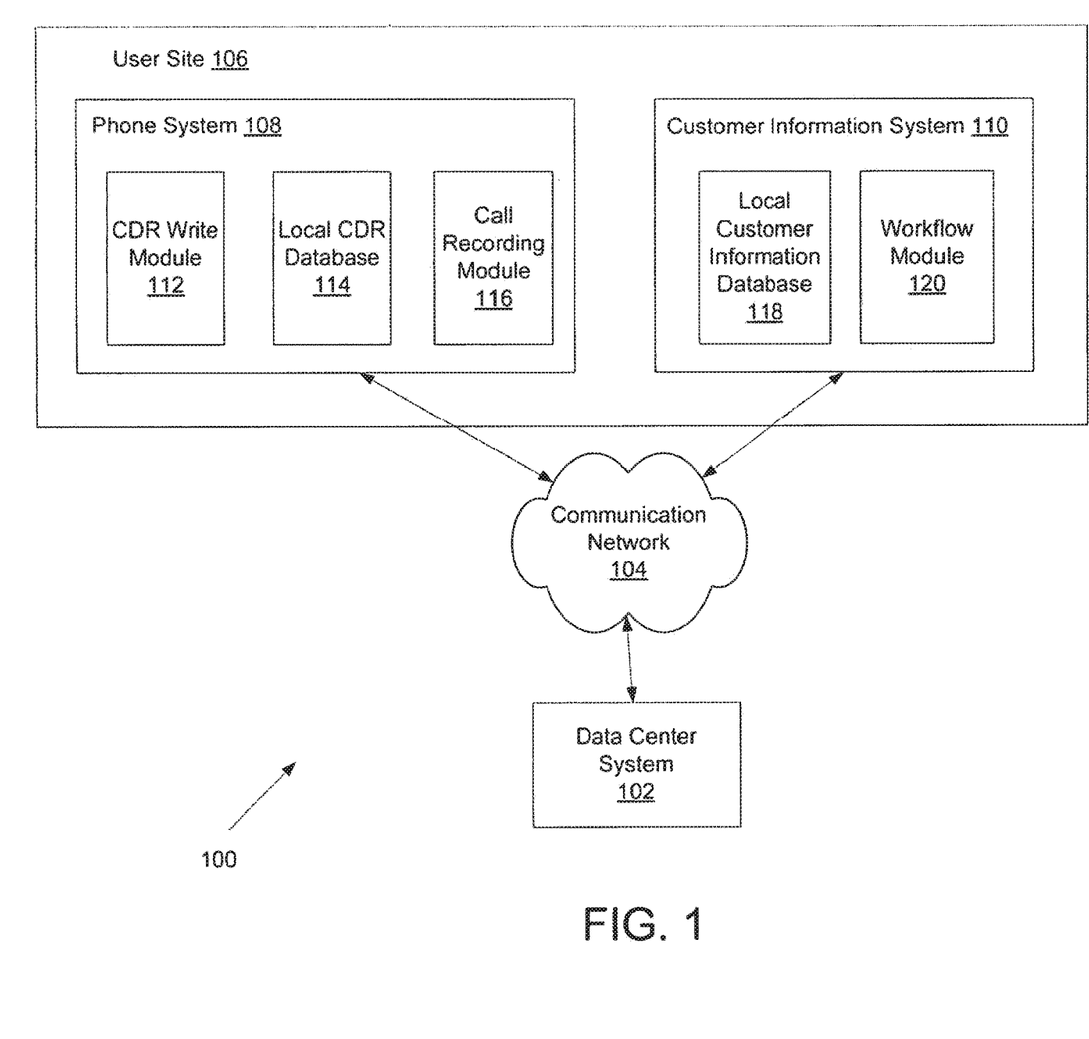
FIG. 1 is a diagram of an exemplary environment in which embodiments of the present invention may be practiced.

FIG. 1 shows an exemplary environment 100 in which embodiments of the present invention may be practiced. The exemplary environment 100 comprises a data center system 102 coupled via a communication network 104 to one or more user sites 106. The communication network 104 may comprise one or more local area networks or wide area networks, such as, for example, the Internet.

In exemplary embodiments, the data center system 102 is configured to generate the call intelligence records and automatically forward the generated call intelligence record to the user site 106. While only one data center system 102 is shown in the exemplary environment 100, alternative embodiments may comprise more than one data center system 102. For example, the data center systems 102 may be regionally established. The data center system 102 will be discussed in more detail in connection with FIG. 2.

The exemplary user site 106 is associated with a company, business, and/or organization using embodiments of the present invention. In some embodiments, the organization may provide sales, services, and/or support to their customers. In exemplary embodiments, the user site 106 may comprise a phone system 108 and a customer information system 110. Additionally, the user site 106 may comprise modules and data which allow the user site 106 to communicate with the data center system 102. The modules and data may be preinstalled at the user site 106. Alternatively, the modules and data may be downloaded to the user site 106 at a later time (e.g., upon first contact with the data center system 102). While only one user site 106 is shown, any number of different organizations may have user sites 106 coupled to the data center system 102.

In exemplary embodiments, the phone system 108 is, or is associated with, a PBX system. The phone system 108 may include one or more storage media or devices comprising a call detail record (CDR) write module 112, a local call detail record (CDR) database 114, and a call recording module 116. The phone system 108 may comprise other components not directed to embodiments of the present invention.

The CDR write module 112 may be configured to automatically record call details of the phone call. These call details—may include a phone number or other identifier (e.g., caller ID) of the customer, duration of the call, and agent or agent identifier associated with the user site 106. The call detail record is then stored in the local CDR database 114. As will be discussed in further detail below, the local CDR database 114 may be accessed by the data center system 102, and the call detail records may be subsequently used to generate call intelligence records.

In some embodiments, the phone system 108 may record the phone conversation between the customer and the agent. In these embodiments, the call recording module 116 performs the automatic recording and storing of the recording to the local CDR database 114 or another database associated with the phone system 108. These call recordings may be automatically associated with the customer information system 110 in conjunction with the call intelligence records as will be discussed in further detail below. For example, the call recording may be stored to the customer information system 110 via the data center system 102 once the identity of the customer is determined. Alternatively, a link may be provided in the customer information system 110 to the call recording. It should be noted that the call recording module 116 is optional in various embodiments.

The exemplary customer information system 110 is configured to store and maintain customer information records. These customer information records may be used by agents, managers, or any other person associated with the organization or user site 106 to review past dealings with a customer. In exemplary embodiments, the customer information system 110 may comprise one or more storage media or devices comprising a local customer information database 118 and a workflow module 120. The customer information system 110 may also comprise other components not directed to embodiments of the present invention. In various embodiments, the customer information system 110 may be a customer relationship management (CRM) system, finance system, enterprise resource management (ERM) system, ticketing system, or any other customer data warehousing system.

The local customer information database 118 is configured to store the customer information records for the user site 106. The customer information records comprise information related to interactions between agents or individuals associated with the user site 106 and their customers. Such information may include date, duration, and subject matter of the interaction along with identity of the individuals (e.g., agents, customers) involved.

The workflow module 120 is configured to generate workflow based on triggers associated with the customer information records. In some embodiments, the workflow module 120 may access customer information records and determine if opportunities or other actions have been followed up on or performed. For example, notifications may be generated and sent to a manager when an opportunity has passed a threshold date without any action. In another example, the opportunity may be reassigned to a different agent when the threshold date has passed without action by an original agent. The workflow module 120 may generate any workflow that can be contemplated for use on the customer information system 110. It should be noted that the workflow module 120 may be located at the data center system 102 in alternative embodiments.

The environment 100 of FIG. 1 is exemplary. Alternative embodiments may comprise any number of data center systems 102 and user sites 106 coupled together via any type of one or more communication networks 104, and still be within the scope of exemplary embodiments of the present invention. Furthermore, each user site 106 may comprise any number of phone systems 108 and customer information systems 110.

Figure 2:
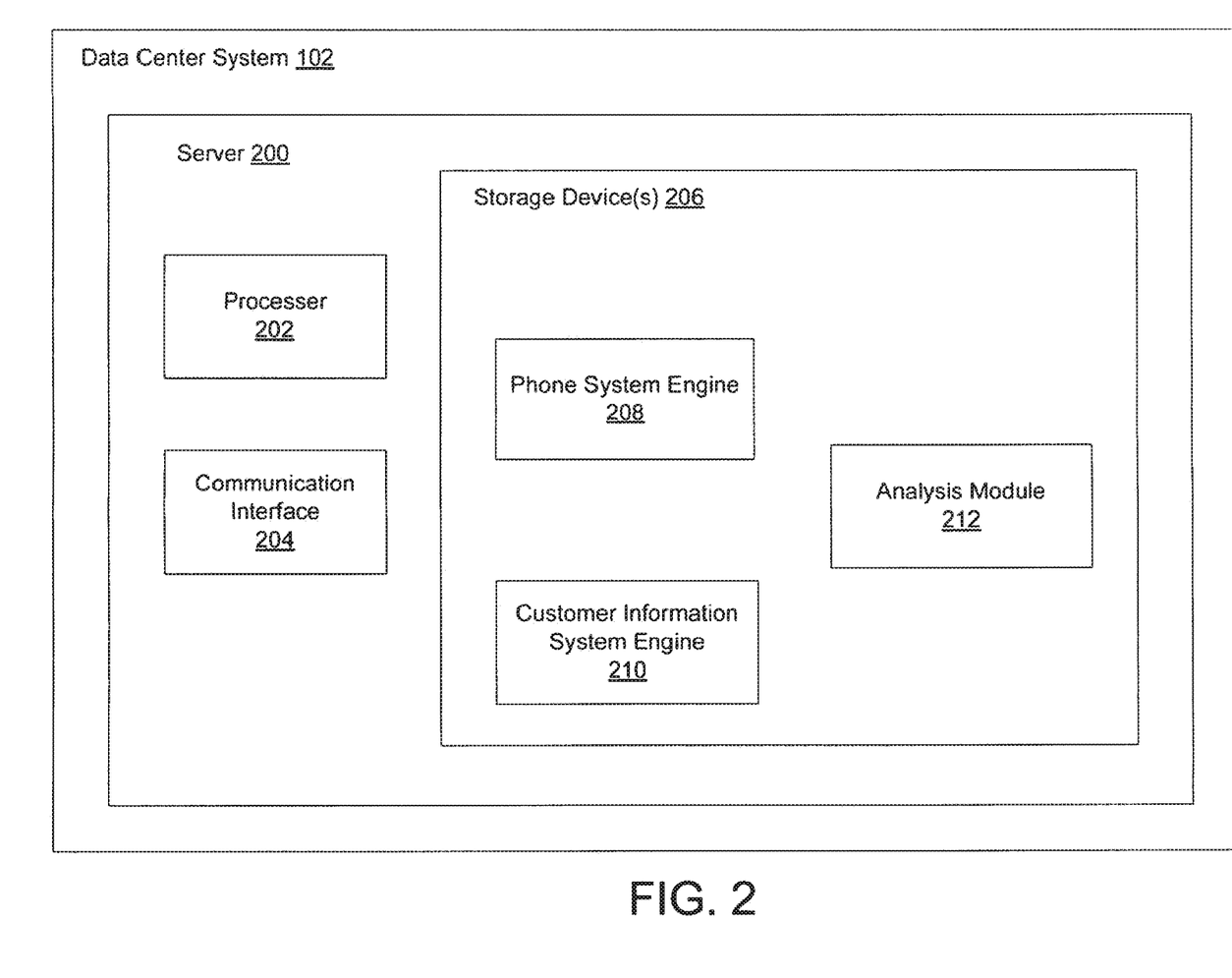
FIG. 2 is a block diagram of an exemplary data center system.

Referring now to FIG. 2, the exemplary data center system 102 is shown in more detail. In exemplary embodiments, the data center system 102 may comprise one or more servers 200, each of which may comprise a processor 202, a communication interface 204, and one or more storage device(s) 206. The communication interface 204 is configured to enable the server 200 to communicate via the communication network 104. In various embodiments, the communication interface 204 may comprise ports, other hardware, and/or software that allow for communications to and from the server 200.

The storage device(s) 206 may comprise storage for a plurality of applications, components, and modules. In the present embodiment, the storage device(s) 206 comprises a phone system engine 208, a customer information system engine 210, and an analysis module 212. In various embodiments, the storage device(s) 206 may comprise memory devices, tape, disks, or integrated circuits. It should be noted that the components shown in the storage device 206 may, in alternative embodiments, be hardware or firmware components.

The phone system engine 208 is configured to interact with the phone system 108. In exemplary embodiments, the phone system engine 208 accesses and/or obtains (e.g., copies) call detail records from the coupled phone system 108. The phone system engine 208 may also access and/or copy recorded calls stored on the phone system 108. In some embodiments, the phone system engine 208 provides information from the data center system 102 to the phone system 108. The phone system engine 208 will be discussed in more detail in connection with FIG. 3.

The customer information system engine 210 is configured to interact with the customer information system 110. In exemplary embodiments, the customer information system engine 210 trades data with the customer information system 110. Specifically, the customer information system engine 210 uses data received from the customer information system 110 to generate call intelligence records, which are then automatically transferred and stored to the customer information system 110. The customer information system engine 210 will be discussed in more detail in connection with FIG. 4.

The exemplary analysis module 212 is configured to perform analysis on the customer information records. In exemplary embodiments, the analysis module 212 is configured to measure effectiveness of employees, analyze customer relationships, and/or perform other analysis and reporting functions. For example, a manager may be able to track what each of his agents are doing (e.g., how often they follow up on opportunities, average time for follow up, which clients are being neglected, etc.). By tracking each agent's productivity and follow-up habits, the manager can assess how each of his agents is performing. It should be noted that in some embodiments, the analysis module 212 may be located at the customer information system 110.

It should be noted that the data center system 102 of FIG. 2 is exemplary. Alternative embodiments may comprise varying numbers of components and other components, and still be within the scope of exemplary embodiments. For example, any number of servers 200 may comprise the data center system 102.

Figure 3:
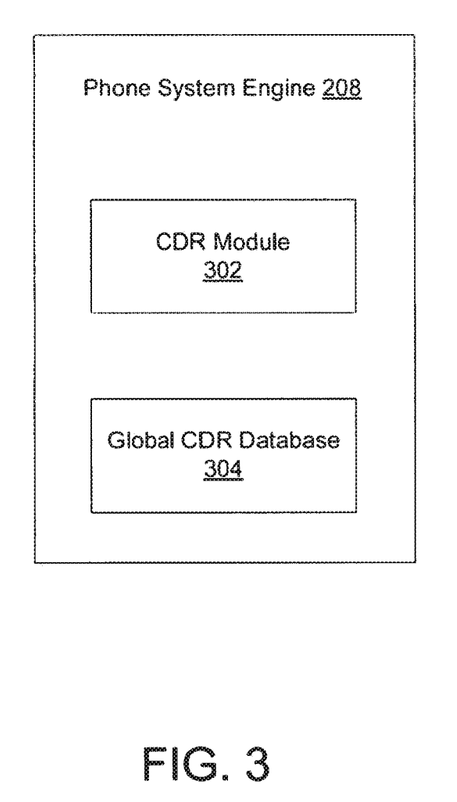
FIG. 3 is a block diagram of an exemplary phone system engine.

Referring now to FIG. 3, the exemplary phone system engine 208 is shown in more detail. The phone system engine 208 is configured to exchange information between the phone system 108 and the data center system 102. The phone system engine 208 may comprise a call detail record (CDR) module 302 and a global CDR database 304. The CDR module 302 is configured to access new call detail records stored in the local CDR database 114. The call detail records may be accessed periodically (e.g., every 5 minutes) or in real-time by the CDR module 302. In accordance with one embodiment, the CDR module 302 may establish an API to the phone system 108 for exchange of data. In other embodiments, the communication interface 204 may establish and maintain the API to the phone system 108.

In some embodiments, the CDR module 302 will copy call detail records from the local CDR database 114 of the phone system 108 onto the global CDR database 304. The copied call detail records may comprise all the current call detail records or only the new call detail records since the last copy process. In situations where all current call detail records are copied, the CDR module 302 may perform analysis to determine which call detail records are new. In alternative embodiments, call detail records are not copied to the global CDR database 304. Instead, the CDR module 302 will communicate via the phone system API with the phone system 108 to exchange call detail record information.

Figure 4:
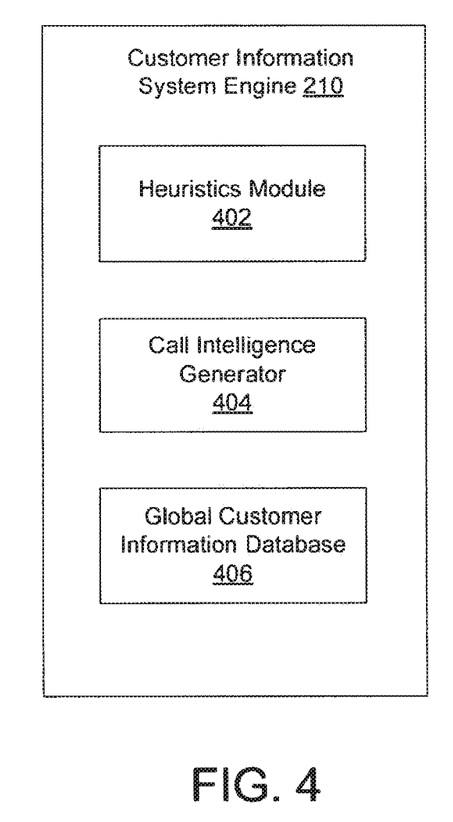
FIG. 4 is a block diagram of an exemplary customer information system engine.

Once the new call detail records are available to the data center system 102, the customer information system engine 210 will analyze each call detail record in order to generate a call intelligence record based on each call detail record. FIG. 4 illustrates the exemplary customer information system engine 210 in more detail. The customer information system engine 210 is further configured to exchange information between the customer information system 110 and the data center system 102. The exchange of information may be facilitated via a customer information system API. The customer information system API may, in some embodiments, be established and maintained by the communication interface 204. In exemplary embodiments, the customer information system engine 210 comprises a heuristics module 402, a call intelligence generator 404, and a global customer information database 406.

The exemplary heuristics module 402 is configured to perform analysis on information associated with the call detail records in order to assign proper call intelligence to correct customer information records. In accordance with one embodiment, the heuristics module 402 may query the phone system 108, the customer information system 110, or a combination of both in order to perform the analysis. With respect to the phone system 108, the heuristics module 402, may query the phone system 108 for an identity of an agent associated with a particular phone call and call detail record. Alternatively, the agent's identity may already be stored in the call detail record. In this case, the heuristics module 402 may pull this information from the call detail record.

With respect to the customer information system 110, the heuristics module 402 may perform a series of queries in order to identify a customer and subject matter associated with the call detail record. For example, the heuristics module 402 may query the local customer information database 118 to determine if a customer in the customer information database 118 is associated with a caller ID from the call detail record (e.g., phone number that is called or from which a call was received). If a customer is identified, then the heuristics module 402 may perform more queries to determine a most current or likely subject matter that is associated with the identified customer. For example, a relationship may exist between the identified customer and identified agent regarding a particular sales opportunity. Therefore, the heuristics module 402 may conclude that a phone call between these two individuals is likely concerning this particular sales opportunity. Further discussion of the heuristics process will be provided in FIG. 6 below.

The exemplary call intelligence generator 404 is configured to generate a call intelligence record based on the call detail record and results from the heuristics module 402. For example, the call detail record may record a caller identifier (e.g., caller ID number) of both a customer and an agent, the date and time of the call along with duration of the call. The heuristics module 402 may determine the identity of the customer (e.g., Bob Jones at XYZ Company) and the subject matter of the conversation (e.g., purchase of model X computers). In some embodiments, the identity of the agent (e.g., Sally Salesperson) may be determined from the call detail record. In other embodiments, the heuristics module 402 may determine the identity of the agent or associates of the agent. Based on all this information, the call intelligence generator 404 will generate a call intelligence record that may be automatically injected into the local customer information database 118 at the customer information system 110 and associated with the identified customer. In the present example, the call intelligence record may read "On Jan. 10, 2009, Sally Salesperson called Bob Jones to discuss the purchase of model X computers. The call lasted 25 minutes."

Once generated, the call intelligence record may then be automatically inserted into the customer information system 110 and become a new entry (i.e., new customer information record) in the customer information database 118. In some embodiments, the call intelligence record may be inserted periodically (e.g., every five minutes). In these embodiments, the call intelligence record may be stored in a cache or the global customer information database 406 until transmission to the customer information system 110. In alternative embodiments, the call intelligence record may be automatically inserted in real-time (e.g., upon generation).

In some embodiments, a local copy of the customer information database 118 of a user site 106 (also referred to as a customer site) may be stored or cached in the global customer information database 406. In these embodiments, the heuristics module 402 does not need to query the local customer information database 118. Instead, the heuristics module 402 may simply query the global customer information database 406. Subsequently, the generated call intelligence record may be stored to the global customer information database 406. Periodically or in real-time, the local customer information database 118 and the global customer information database 406 may be synchronized thus allowing new customer information records to be included in the global customer information database 406 while injecting the generated call intelligence records onto the local customer information database 118.

Once stored to the customer information database 118 or 406, various reports or workflow may be generated based on the customer information records. For example, the workflow module 120 may track the customer information records and entries to trigger workflow. Alternatively, the analysis module 212 may generate reports based on the customer information records.

Figure 5:
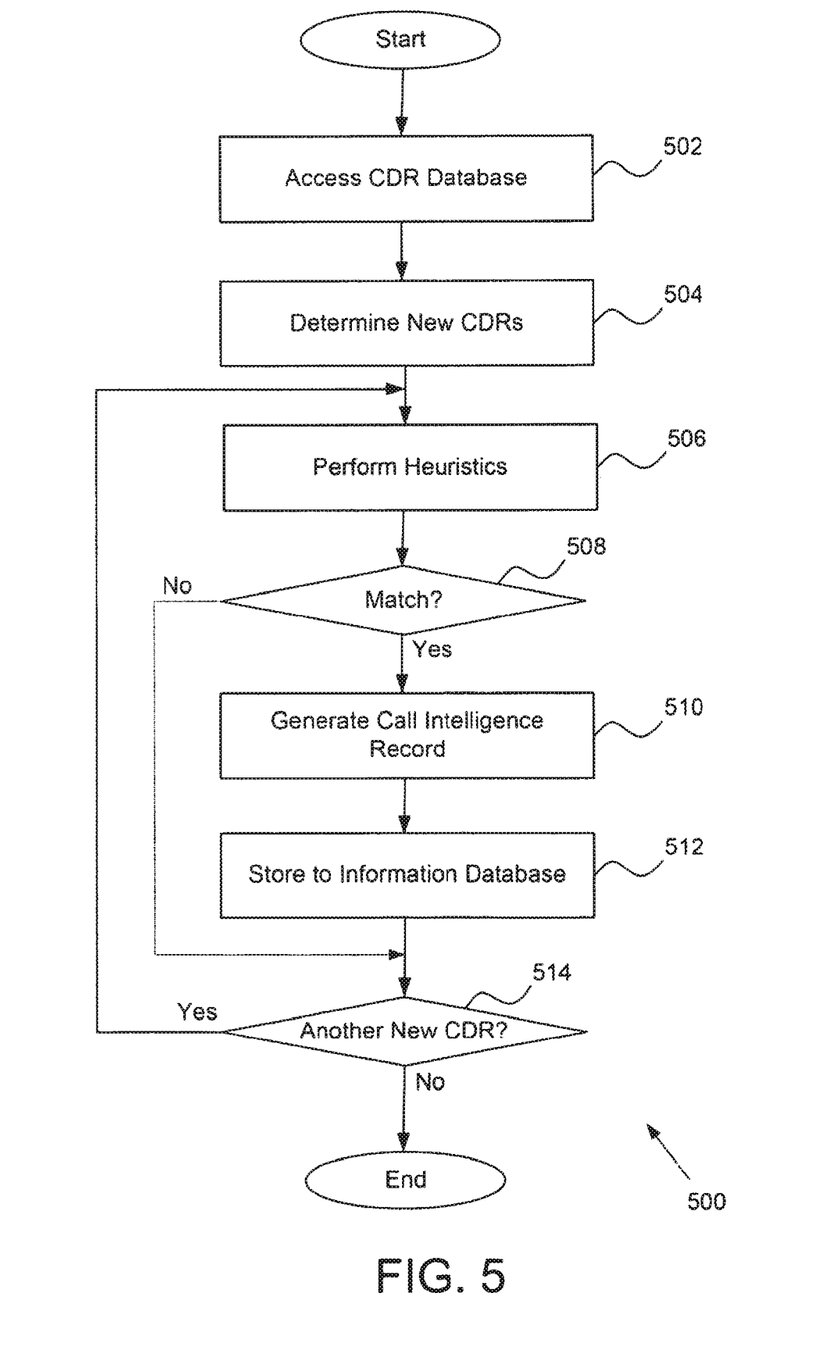
FIG. 5 is a flowchart of an exemplary method for automatic insertion of call intelligence in a customer information system.

Referring now to FIG. 5, a flowchart 500 of an exemplary method for automatic insertion of call intelligence in the customer information system 110 is shown. In step 502, a CDR database is accessed. In some embodiments, the CDR module 302 may access the local CDR database 114. In other embodiments, the call detail records in the local CDR database 114 may be copied to the global CDR database 304 by the CDR module 302. The call detail records may be accessed and/or copied periodically or in real-time.

New call detail records are determined in step 504. In one embodiment, the CDR module 302 may determine which call detail records have not been previously processed. For example, call detail records with generation timestamps after the last access or copy process may be determined to be new. Analysis of the new call detail records may then be performed by the customer information system engine 210.

In step 506, heuristics is performed on each of the new call detail records by the heuristics module 402. Heuristics performance includes querying a customer information database (e.g., local customer information database 118 and/or global customer information database 406) based on information contained in the call detail record. The heuristics process will be discussed in more detail in connection with FIG. 6 below.

If a match is found in step 508 based on the heuristics processing of step 506, then a call intelligence record is generated in step 510. The call intelligence record will provide details of the phone conversation include the identity of the parties involved, time, duration, and subject matter of the conversation. In exemplary embodiments, the call intelligence record is generated by the call intelligence generator 404.

The call intelligence record may then be automatically inserted into the customer information database 118 and/or 406 and associated with the identified customer in step 512. the inserted call intelligence record thus becomes a new entry or record in the customer information database 118 and/or 406. The call intelligence record may be inserted into the customer information database 118 and/or 406 periodically or in real-time. As a result, the customer information system 110 is able to maintain thorough records of any communication with a customer where a call detail record can be associated with the customer.

Next in step 514, a determination is made as to whether there is another new call detail records to process. If there is another new call detail record, then the process returns to step 506 such that the information in the new call detail record may be processed by the heuristics module 402.

Figure 6:
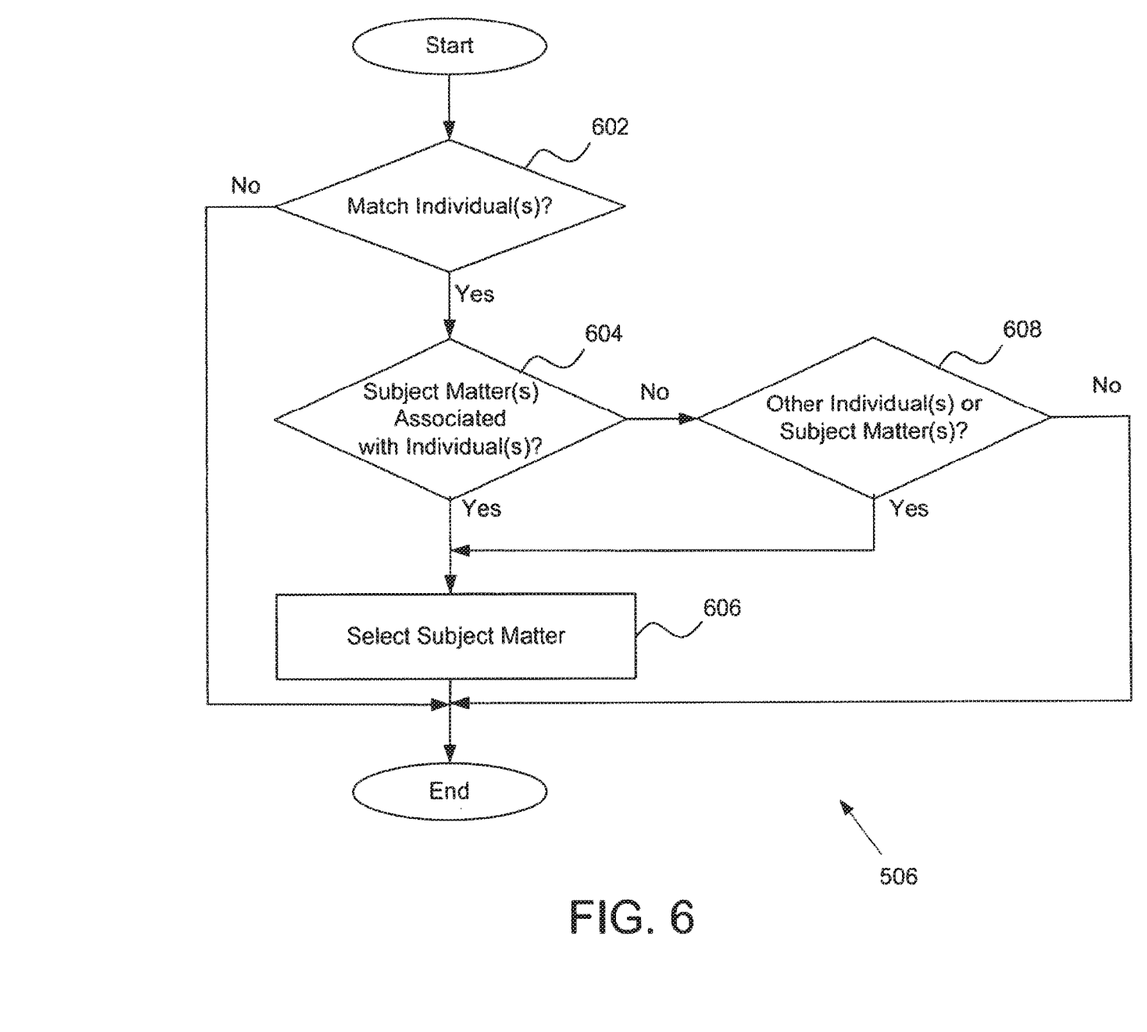
FIG. 6 is a flowchart of an exemplary method for generating a call intelligence record.

FIG. 6 is a detailed flowchart of the heuristics process (step 506). In exemplary embodiments, the heuristics process is performed by the heuristics module 402. In these embodiments, the heuristics module 402 queries one or more customer information databases 118 and/or 406 in order to determine participating individuals and subject matter associated with a particular call detail record.

In step 602, a determination is made as to whether the caller identifier in the call detail record matches an existing customer or individual in the customer information database 118 or 406. In exemplary embodiments, the caller identifier may be a phone number or automatic number identification (ANI) of the customer (either calling or being called). The caller identifier may be cross-referenced with identifiers stored in the customer information database 118 or 406 to identify the customer.

An identification of the agent associated with the user site 106 may also be determined or matched in step 602. In some embodiments, the agent may be identified in the call detail record. Alternatively, a query may be made to the phone system 108 to determine the agent associated with the new call detail record.

If a customer is identified, then a determination is made as to whether any opportunities or subject matters the call detail records may be related to exist in the customer information database 118 and/or 406 in step 604. Because the identity of both the customer and the agent are now known, queries may be made to determine whether there are any established relationships between the two identified individuals. For example, if a phone call is made between an individual in an accounting department with a particular customer, then there will be no (business or sales) opportunity associated with the call detail records. However, if the phone call is between a sales agent and a customer who, in the past, have been discussing a purchase of a new computer system, then the subject matter may be determined to be the a computer system sales opportunity.

If one or more subject matters are identified in step 604, then in step 606, a most likely opportunity associated with the call detail record is selected. A particular opportunity or subject matter may be assigned to the identified agent with respect to the identified customer, thus resulting in a selection of the particular opportunity or subject matter. Alternatively, the selected opportunity or subject matter is a most current opportunity associated with the two identified individuals (i.e., agent and customer). As a result, a particular opportunity may be identified as the subject matter of the phone call. For example, if the customer has been talking to the identified agent regarding five different sales opportunities, then the most recent or current sales opportunity may be selected. Other criteria may also be utilized to determine the most likely subject matter associated with the call detail record.

If in step 604 subject matters are not found associated with both the identified agent and customer, a determination is made as to whether there are other individuals associated with the identified customer in step 608. For example, other individuals from the same company as the identified customer may be in the customer information system 110 and may have open sales opportunities with the organization. In another example, one or more other agents of the user site 106 may be working on an opportunity with the identified customer, and the customer information records may be associated with one of these other agents. By querying the customer information database 118 or 406 with these expanded criteria, the heuristics module 402 may identify the proper individuals, subject matter, and/or opportunities which may be related to the call detail record. The results of the analysis in step 608 are then filtered in step 606 to select a particular opportunity or subject matter to associate with the call detail record. In some embodiments, only one opportunity is identified in step 604 or step 608. Therefore, step 606 is not necessary in these embodiments.

It should be noted that the methods of FIG. 5 through FIG. 6 are exemplary methods. Alternative embodiments may contemplate different steps, combination of steps, or different order to the steps and still be within the scope of exemplary embodiments of the present invention. Additionally, some steps of FIG. 5 and FIG. 6 may be optional in alternative embodiments.

Figure 7:
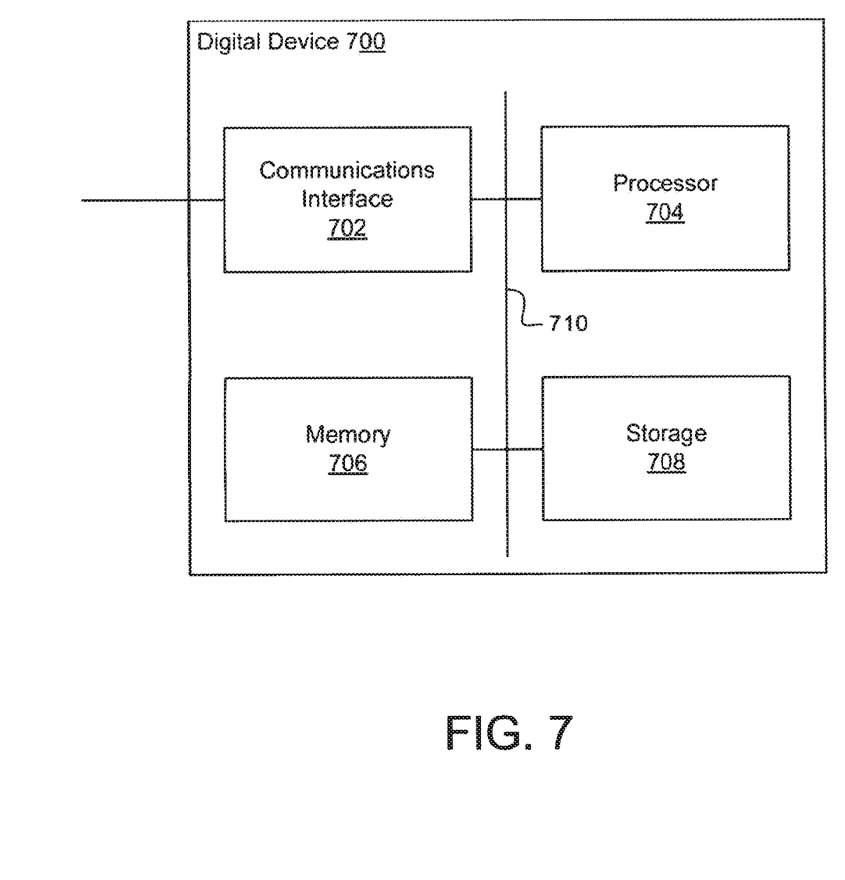
FIG. 7 is a block diagram of a digital device which may be used in accordance with exemplary embodiments.

FIG. 7 is a block diagram of an exemplary digital device 700 (also referred to as computing device 700) that may be used. The digital device 700 may comprise devices associated with the data center system 102 and user site 106 according to exemplary embodiments. The computing device 700 comprises a communications interface 702, a processor 704, a memory 706, and storage 708, which are all coupled to a bus 710. The bus 710 provides communications between the communications interface 702, processor 704, memory 706, and storage 708. The processor 704 executes instructions, while the memory 706 permanently or temporarily stores data. Some examples of the memory 706 are RAM and ROM. The storage 708 may also permanently or temporarily stores data. Some examples of the storage 708 are hard disks and disk drives.

The embodiments of computing device 700 discussed herein are illustrative. As these embodiments are described with reference to illustrations, various modifications or adaptations of the methods and/or specific structures described may become apparent to those skilled in the art.

The above-described functions and components can be comprised of instructions that are stored on a storage medium. The instructions can be retrieved and executed by a processor (e.g., processor 704). Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A computer-implemented method for automatically inserting a call intelligence content into a customer relationship management (CRM) system, the computer-implemented method comprising:
   accessing, via a processor, a new call detail record associated with a time span from when a phone call between a first user and a second user is initiated and the phone call is terminated, wherein the new call detail record is stored in a first database within a phone system at a user site, wherein the new call detail record is associated with the phone call;
   identifying, via the processor, a database record associated with the new call detail record, wherein the database record is associated with at least one of the first user or the second user, wherein the database record is stored in a second database within the CRM system at the user site, wherein the phone system is separate and distinct from the CRM system;
   forming, by the processor, a copy of a portion of the new call detail record from the first database;
   determining, via the processor, a most likely subject matter content associated with the copy of the portion of the new call detail record based on a series of queries to a third database and a fourth database, wherein each of the third database and the fourth database is within a data center system that is separate and distinct from the user site, wherein the series of queries include (i) a first query to the third database for information relating to a phone number associated with the phone call, a duration of the phone call, and an identification of the at least one of the first user or the second user, (ii) a second query to the fourth database for an established relationship between the first user and the second user based on the database record, and (iii) a third query to the fourth database for a most recent subject matter content associated with the established relationship, wherein the third database is associated with the first database, wherein the fourth database is associated with the second database;
   generating, via the processor, a call intelligence record in the fourth database based on the at least one of the first user or the second user and the most likely subject matter content; and
   inserting, via the processor, the call intelligence record from the fourth database into the second database in association with the new call detail record in the first database, in direct response to generating the call intelligence record within the fourth database.

2. The method of claim 1, wherein identifying the database record associated with the at least one of the first user or the second user comprises determining an identity of the at least one of the first user or the second user that is associated with a caller ID in the new call detail record.

3. The method of claim 1, wherein identifying the database record associated with the at least one of the first user or the second user comprises determining a caller agent associated with the new call detail record.

4. The method of claim 1, wherein determining the most likely subject matter content comprises determining at least one of a most recent subject matter content associated with the database record associated with the at least one of the first user and the second user, an open subject matter associated with the database record associated with the at least one of the first user and the second user, or an existing relationship associated with the database record associated with the at least one of the first user and the second user.

5. The method of claim 1, wherein determining the most likely subject matter content comprises determining other individuals identifications or subject matter content associated with the database record associated with the at least one of the first user and the second user.

6. The method of claim 1, wherein inserting the call intelligence record into the CRM system, in direct response to generating the call intelligence record within the fourth database comprises sending the call intelligence record through a network to the CRM system, wherein the data center system is connected to the network, wherein the user site is connected to the network, wherein the network is positioned logically between the user site and the data center system.

7. An arrangement comprising:
   a data center system and a user site system, wherein the data center system is separate and distinct from the user site system, wherein the data center system includes a processor, a communication interface, a phone system engine, and a customer relationship management (CRM) system engine, wherein the phone system engine is separate and distinct from the CRM system engine, wherein the user site system includes a phone system and a CRM system, wherein the phone system engine is associated with the phone system, wherein the CRM system engine is associated with the CRM system, wherein the phone system is separate and distinct from the CRM system, wherein the phone system includes a first database, wherein the CRM system includes a second database, wherein the phone system engine includes a third database, wherein the CRM engine includes a fourth database, wherein the processor is programmed to:

receive a request from the phone system engine;
responsive to the request:
- instruct the communication interface to request a copy of a call detail record from the first database, wherein the call detail record includes a caller identifier and a caller identifier;
- receive the copy from the communication interface;
- write the copy to the third database;
- instruct the CRM system engine to (a) read the copy in the third database and (b) generate a call intelligence record in the fourth database based on the CRM system engine (i) querying the second database via the communication interface to determine that the caller identifier from the copy in the third database is present in the second database, (ii) identifying a relationship between the caller identifier and the caller identifier in the fourth database based on the caller identifier from the copy in the third database being present in the second database, (iii) selecting a most current or likely subject matter content that is associated with the relationship in the fourth database, and (iv) populating the call intelligence record with the most current or likely subject matter content; and
- instruct the CRM system engine to copy the call intelligence record from the fourth database into the second database via the communication interface.

* * * * *